United States Patent [19]

Bearden, Jr. et al.

[11] Patent Number: 4,637,870
[45] Date of Patent: Jan. 20, 1987

[54] HYDROCRACKING WITH PHOSPHOMOLYBDIC ACID AND PHOSPHORIC ACID

[75] Inventors: Roby Bearden, Jr.; Clyde L. Aldridge, both of Baton Rouge, La.

[73] Assignee: Exxon Research and Engineering Company, Florham Park, N.J.

[21] Appl. No.: 785,986

[22] Filed: Oct. 10, 1985

Related U.S. Application Data

[63] Continuation-in-part of Ser. No. 728,280, Apr. 29, 1985.

[51] Int. Cl.⁴ ............................................. C10G 47/04
[52] U.S. Cl. .................................. 208/112; 208/108; 208/420
[58] Field of Search .................... 208/112 L, 108, 420

[56] References Cited

U.S. PATENT DOCUMENTS

| | | | |
|---|---|---|---|
| 3,162,594 | 12/1964 | Gorin | 208/57 |
| 4,077,867 | 3/1978 | Aldridge et al. | 208/10 |
| 4,111,787 | 9/1978 | Aldridge et al. | 208/10 |
| 4,196,072 | 4/1980 | Aldridge et al. | 208/10 |
| 4,226,742 | 10/1980 | Bearden, Jr. et al. | 252/431 |
| 4,244,839 | 1/1981 | Aldridge et al. | 252/431 |
| 4,285,804 | 8/1981 | Jacquin et al. | 208/48 R |
| 4,424,110 | 1/1984 | Bearden, Jr. et al. | 208/10 |
| 4,431,520 | 2/1984 | Giuliani et al. | 208/108 |
| 4,548,700 | 10/1985 | Bearden, Jr. et al. | 208/108 |

Primary Examiner—John Doll
Assistant Examiner—Lance Johnson
Attorney, Agent, or Firm—Marthe L. Gibbons

[57] ABSTRACT

Hydroconversion processes for converting oil, coal or mixtures thereof are provided utilizing a catalyst prepared by first forming an aqueous solution of phosphomolybdic acid and phosphoric acid at a specified ratio of atoms of P/Mo, and subsequently adding this solution to a hydrocarbon material, followed by heating in the presence of $H_2$ and/or $H_2S$ to form a solid molybdenum and phosphorus-containing catalyst.

12 Claims, 1 Drawing Figure

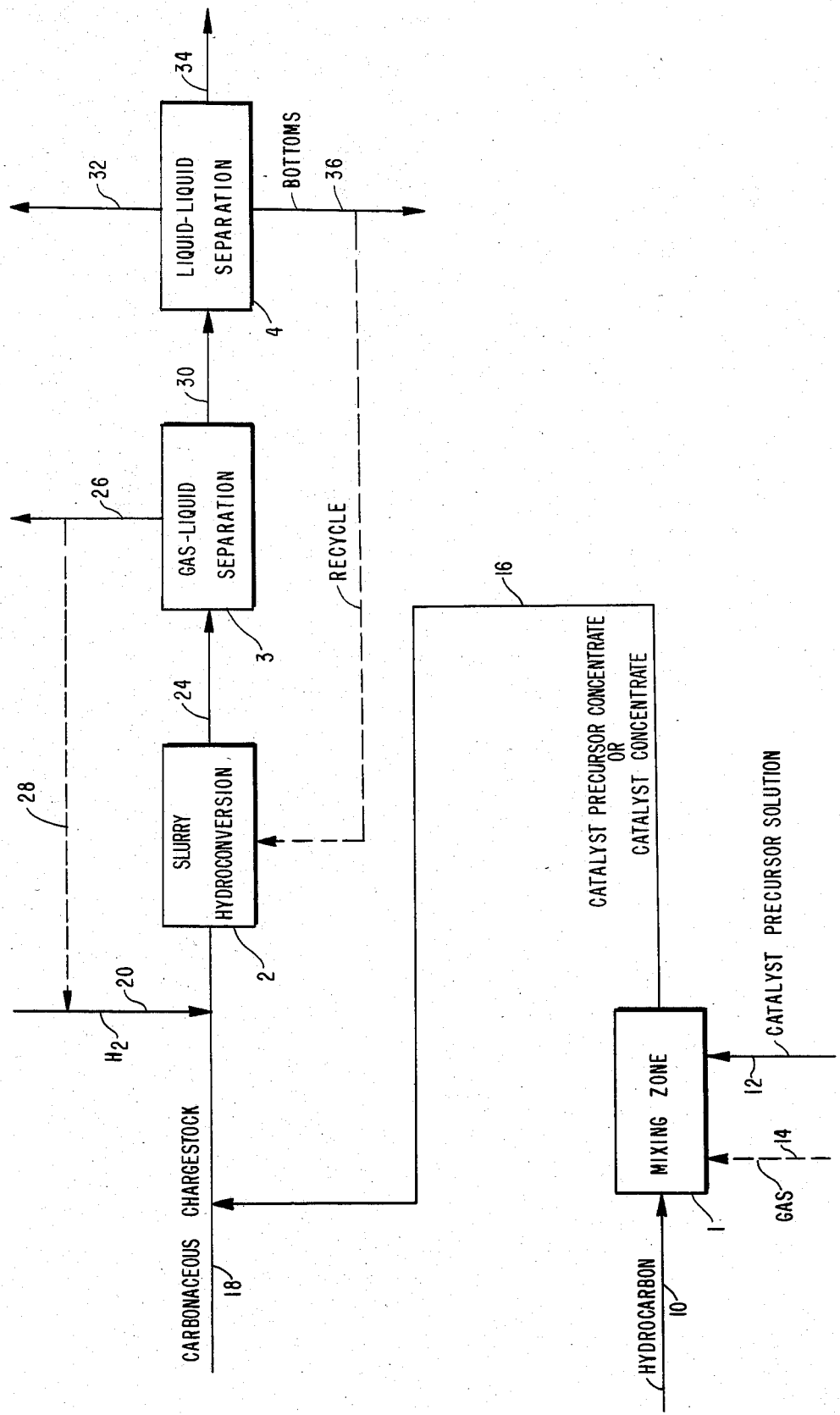

HYDROCRACKING WITH PHOSPHOMOLYBDIC ACID AND PHOSPHORIC ACID

CROSS REFERENCE TO RELATED APPLICATIONS

This application is a continuation-in-part of U.S. patent application Ser. No. 728,280 filed Apr. 29, 1985, the teachings of which are hereby incorporated by reference.

BACKGROUND OF THE INVENTION

1. Field of the Invention

This invention relates to an improvement in a slurry hydroconversion process utilizing a metal-containing catalyst prepared from a catalyst precursor dispersed in a hydrocarbon.

2. Description of Information Disclosures

Slurry hydroconversion processes utilizing a catalyst prepared in a hydrocarbon oil from thermally decomposable or oil soluble metal compound precursors are known. See, for example, U.S. Pat. Nos. 4,226,742 and 4,244,839.

It is also known to use such catalysts in hydroconversion processes (i.e., coal liquefaction) in which coal particles are slurried in a hydrocarbonaceous material. See, for example, U.S. Pat. No. 4,077,867.

U.S. Pat. No. 4,196,072 discloses adding phosphoric acid and a poly acid such as phosphomolybdic acid in a specified ratio to a carbonaceous chargestock of a hydroconversion process and converting said poly acid and phosphoric acid to a solid catalyst in said carbonaceous chargestock.

It has now been found that if the phosphoric acid ($H_3PO_4$) is added first to an aqueous solution of phosphomolybdic acid and the resulting mixture is mixed subsequently with a hydrocarbon to produce a catalyst precursor concentrate or a catalyst concentrate which is thereafter introduced into the carbonaceous chargestock, less undesired coke is produced and more normally liquid and normally gaseous hydrocarbon products are produced.

The term "hydroconversion" with reference to a hydrocarbonaceous oil is used herein to designate a catalytic process conducted in the presence of hydrogen in which at least a portion of the heavy constituents of the oil is converted to lower boiling hydrocarbon products while it may simultaneously reduce the concentration of nitrogenous compounds, sulfur compounds and metallic constituents of the oil.

The term "hydroconversion" with reference to coal is used herein to designate a catalytic conversion of coal to normally liquid hydrocarbons in the presence of hydrogen.

All boiling points referred to herein are atmospheric pressure equivalent boiling points unless otherwise specified.

SUMMARY OF THE INVENTION

In accordance with the invention, there is provided a process for hydroconverting a carbonaceous chargestock comprising a catalyst to produce a hydroconverted oil product, which comprises reacting said carbonaceous chargestock with hydrogen at hydroconversion conditions, including a temperature ranging from about 800° to 900° F., said catalyst having been prepared by the steps which comprise: (a) adding phosphoric acid to an aqueous solution of phosphomolybdic acid in an amount to provide an atomic ratio of phosphorus to molybdenum ranging from 0.12:1 to 0.45:1; and, subsequently (b) forming a mixture of a hydrocarbonaceous material and the aqueous solution resulting from step (a), in an amount to provide from about 0.2 to 2 weight percent molybdenum, calculated as elemental metal, based on said hydrocarbonaceous material to produce a catalyst precursor concentrate; (c) introducing at least a portion of said catalyst precursor concentrate into said carbonaceous chargestock; and (d) heating the mixture resulting from step (b), or the mixture resulting from step (c) in the presence of a gas selected from the group consisting of a hydrogen-containing gas, a hydrogen sulfide-containing gas and mixtures thereof at conditions to convert said phosphomolybdic acid and said phosphoric acid to a solid molybdenum and phosphorus-containing catalyst.

BRIEF DESCRIPTION OF THE DRAWING

The FIGURE is a schematic flow plan of one embodiment of the invention.

DESCRIPTION OF THE PREFERRED EMBODIMENT

Referring to FIGURE, a heavy hydrocarbonaceous oil is introduced by line 10 into mixing zone 1. Suitable heavy hydrocarbonaceous oils for introduction into mixing zone 1, which may also serve as catalyst preparation zone, include hydrocarbonaceous oils comprising constituents boiling above 1050° F., preferably having at least 10 wt.% constituents boiling above 1050° F., such as crude oils, atmospheric residuum boiling above 650° F., vacuum residua boiling above 1050° F. Preferably, the hydrocarbonaceous oil has an initial boiling point above at least 650° F. and comprises asphaltenes. Instead of using one zone such as mixing zone 1 as both mixing and catalyst preparation zone, a separate zone or vessel could be used after mixing zone 1 to prepare the catalyst (i.e., convert the catalyst precursor to the solid catalyst). The hydrocarbonaceous oil carried by line 10 may be derived from any source such as petroleum, tar sand oil, shale oil, liquids derived from coal liquefaction processes and mixtures thereof. Generally, these oils have a Conradson carbon content ranging from about 5 to about 50 wt.% (as to Conradson carbon, see ASTM test D-189-65). Phosphoric acid is added to an aqueous solution of phosphomolybdic acid and the resulting catalyst precursor solution is introduced into mixing zone 1 by line 12. It should be noted that commercially available phosphomolybdic acid, as purchased, typically contains an atomic ratio of P/Mo ranging from about 0.08:1 to 0.10:1. The phosphoric acid is added to the phosphomolybdic acid in an amount to provide an atomic ratio of phosphorus to molybdenum (P/Mo) in the solution ranging from 0.12:1 to 0.45:1, preferably, from 0.2:1 to 0.4:1. This ratio includes the total phosphorus present, that is, the phosphorus derived from the phosphoric acid and the phosphorus derived from the phosphomolybdic acid. The term "atom" is used herein to connote a gram-atom. A sufficient amount of the aqueous phosphomolybdic acid plus phosphoric acid solution (catalyst precursor solution) is introduced into mixing zone 1 to provide from about 0.2 to 2, preferably from about 0.2 to 1 wt.%, more preferably from about 0.3 to 1 wt.% molybdenum from the phosphomolybdic acid, calculated as elemental metal based on the hydrocarbonaceous oil. The resulting mixture will herein be designated "catalyst precursor concentrate". Preferably, any water that may still be present in the catalyst precursor concentrate (i.e., water that has not yet evaporated) is removed from the catalyst precursor concentrate (dewatered) by heating the catalyst precursor concentrate to a temperature sufficient to evaporate (flash off) the water. If desired, the phosphomolybdic acid and phosphoric acid (catalyst precursor) may be converted to a solid catalyst in mixing zone 1 by introducing a gas selected from the group consisting of hydrogen-containing gas, a hydrogen sulfide-containing gas and mixtures thereof by line 14 into mixing zone 1 and heating the catalyst precursor concentrate to a temperature ranging from about 500° to 779° F., more preferably to a temperature ranging from 650° to 779° F., more preferably from about 680° to 730° F., and a total pressure ranging from 50 to 5000 psig, preferably from about 100 to about 2000 psig. Preferably the gas comprises hydrogen and from about 1 to 90 mole percent hydrogen sulfide based on the total gas. It is not necessary to convert the phosphomolybdic acid and phosphoric acid to a solid catalyst at this stage. If the catalyst precursor concentrate is not heated in the presence of a gas at conditions to convert the phosphomolybdic acid and phosphoric acid to the solid molybdenum and phosphorus-containing catalyst, then the effluent of the mixing zone removed by line 16 will be the catalyst precursor concentrate. Preferably, water is removed from the catalyst precursor concentrate either in zone 1 by heating the catalyst precursor concentrate at a temperature sufficient to evaporate the water or the catalyst precursor concentrate, after being removed from zone 1, may be passed to a drying zone (not shown) to evaporate water from the catalyst precursor concentrate. The molybdenum and phosphorus-containing concentrate, which may be a catalyst concentrate or a catalyst precursor concentrate, is removed by line 16 and introduced into line 18 which carries a carbonaceous chargestock comprising a hydrocarbon. The hydrocarbon comprised in the chargestock may have the same or a different boiling point range from the boiling point range of the hydrocarbon of line 10. The carbonaceous chargestock may be a hydrocarbonaceous oil or coal in a hydrocarbon diluent. Suitable hydrocarbonaceous oil chargestocks include crude oils; mixtures of hydrocarbons boiling above 430° F., preferably above 650° F., for example, gas oils, vacuum residua, atmospheric residua, once through coker bottoms. The hydrocarbonaceous oil chargestock may be derived from any source, such as petroleum, shale oil, tar sand oil, oils derived from coal liquefaction processes, including coal liquefaction bottoms, and mixtures thereof. Preferably, the hydrocarbonaceous oils have at least 10 wt.% materials boiling above 1050° F. More preferably, the hydrocarbonaceous oils have a Conradson carbon content ranging from about 5 to about 50 wt.%. Coal may be added to any of these oils. Alternatively, slurries of coal in a hydrocarbon diluent may be used as chargestock to convert the coal (i.e., coal liquefaction). The diluent may be a single type of hydrocarbon or a mixture of hydrocarbons and may be a light hydrocarbon or a heavy hydrocarbon, as described in U.S. Pat. No. 4,094,765, column 1, lines 54 to column 2, line 43, the teachings of which are hereby incorporated by reference. When the chargestock into which at least a portion of the catalyst precursor concentrate or catalyst concentrate of line 16 is introduced is an oil, the concentrate disperses in the oil. If the chargestock comprises coal in a diluent, the portion of concentrate of line 16 is added to the diluent before, after or simultaneously with the addition of coal to the diluent. If the catalyst precursor concentrate has been added to the carbonaceous chargestock (instead of the catalyst concentrate), the phosphomolybdic acid and phosphoric acid may be converted to the solid molybenum and phosphorus-containing catalyst at this stage by heating the resulting mixture of at least a portion of the carbonaceous chargestock and catalyst precursor in the presence of a gas selected from the group consisting of hydrogen-containing gas, hydrogen sulfide-containing gas or mixtures thereof at a temperature ranging from about 500° to about 779° F., more preferably at a temperature ranging from about 650° to 779° F., and a total pressure ranging from about 50 to about 5000 psig, preferably a pressure ranging from about 100 to 2000 psig. Alternatively, the chargestock comprising the catalyst precursor concentrate may be passed into the hydroconversion zone and the phosphomolybdic acid and phosphoric acid may be converted to the solid molybenum and phosphorus-containing catalyst to hydroconversion conditions. A hydrogen-containing gas is introduced by line 20 into line 18. The mixture of carbonaceous chargestock, catalyst concentrate or catalyst precursor concentrate and hydrogen is passed into slurry hydroconversion zone 2. If the phosphomolybdic acid and phosphoric acid have not yet been converted to the solid catalyst, then the mixture of phosphomolybdic acid and phosphoric acid in the carbonaceous chargestock introduced into the hydroconversion zone 2 is converted to a solid catalyst at hydroconversion conditions. The catalyst precursor concentrate of line 16 is added to the carbonaceous chargestock in an amount sufficient to provide from about 10 to about 2000 wppm molybdenum, preferably 50 to 1000 wppm molybdenum, calculated as the elemental metal, based on the total hydroconversion zone chargestock, i.e., concentrate plus carbonaceous chargestock.

Suitable hydroconversion operating conditions are summarized in Table I.

TABLE I

| Conditions | Broad Range | Preferred Range |
|---|---|---|
| Temp., °F. | 800 to 900 | 820 to 870 |
| H₂ Partial Pressure, psig | 50 to 5000 | 100 to 2000 |

The hydroconversion zone effluent is removed by line 24 and passed to a gas-liquid separation zone 3 wherein the normally gaseous phase is separated from a normally liquid phase. The gaseous phase is removed from separation zone 3 by line 26. Alternatively, the gaseous phase, which comprises hydrogen, may be recycled by line 28, preferably after removal of undesired constituents, to slurry hydroconversion zone 2 via line 20. The normally liquid phase, which comprises the molybdenum-containing catalytic solids and a hydroconverted hydrocarbonaceous oil product is passed by line 30 to separation zone 4 for fractionation by conventional means, such as distillation into various fractions such as light, medium boiling and heavy bottoms fractions. The light fraction is removed by line 32. The medium boiling fraction is removed by line 34. The heavy bottoms fraction is removed by line 36, and, if desired, at least a portion of the bottoms fraction comprising catalytic solids may be recycled to hydroconversion zone 2.

Furthermore, if desired, the catalytic solids may be separated from the hydroconverted oil product and the separated solids may be recycled to hydroconversion zone 2. The following examples are presented to illustrate the invention.

EXAMPLE 1

Preparation Of Catalyst Precursor Concentrate Comprising Phosphoric Acid Modified Phosphomolybdic Acid In Atmospheric Residuum (Pitched Blade Impeller)

Catalyst precursor concentrate preparation was carried out in a stainless steel tank that had a mixing zone with an internal diameter of 10 inches and a height of 12 inches. A six-inch diameter, pitched blade impeller with four 45° blades was used for stirring and was operated at a speed of 400 revolutions per minute. Heat was supplied by high pressure steam in coils on external surfaces of the tank and the tank was equipped for maintaining a nitrogen atmosphere during concentrate preparations.

In the first step of precursor concentrate preparation, 48.35 g of a crystalline, commercial grade phosphomolybdic acid (0.083/1 P/Mo atom ratio, 54.9 wt.% Mo) was dissolved in 601.1 g of deionized water at about 120° F. and upon cooling to room temperature (approximately 76° F.) was mixed with 5.61 g of commercial-grade phosphoric acid that contained 4.80 g (0.048 mole) of phosphoric acid and 0.81 g of water.

Next, 12,602 g of a heavy Arabian atmospheric residuum that contained 50 wt.% material boiling above 975° F., 48 wt.% material boiling above 1050° F. and 11.9 wt.% of Conradson carbon components, was charged to the mix tank, flushed with nitrogen and heated with stirring from room temperature to 178° F. At this point, the 663.3 g of phosphoric acid modified phosphomolybdic acid solution was charged to the tank (about 15 seconds required) and stirring was continued for 30 minutes at 178° F. under a nitrogen atmosphere.

The resultant catalyst precursor concentrate, which contained 0.2 wt.% Mo and had a P/Mo atom ratio of 0.26, was removed from the tank and stored at room temperature under nitrogen. This catalyst precursor concentrate of Example 1 is a catalyst precursor concentrate in accordance with the present invention.

EXAMPLE 2 (COMPARATIVE)

Preparation Of Catalyst Precursor Concentrate Comprising Phosphomolybdic Acid In Atmospheric Residuum A catalyst precursor concentrate was prepared according to the procedure given in Example 1, except that phosphoric acid was not added to the water solution of phosphomolybdic acid.

The water solution that was mixed with the residuum consisted of 48.35 g of the commercial-grade phosphomolybdic acid (0.083/1 P/Mo atom ratio, 54.87% Mo) in 614.9 g of deionized water.

The resultant catalyst precursor concentrate contained 0.2 wt.% Mo and had a P/Mo atom ratio of 0.083/1. This catalyst precursor concentrate of Example 2 is not a catalyst precursor in accordance with the present invention.

EXAMPLE 3

Preparation Of Catalyst Precursor Concentrate Comprising Phosphoric Acid Modified Phosphomolybdic Acid In Atmospheric Residuum (Flat Blade Turbine)

A catalyst precursor concentrate was prepared according to the procedure given in Example 1 except that (1) the pitched blade impeller was replaced with a 4⅜ inch diameter, flat blade turbine with six blades and (2) the impeller was operated at 810 rpm.

The water solution that was mixed with the residuum contained 56.3 g of phosphomolybdic acid (0.083/1 P/Mo atom ratio, 47.08% Mo) and a 5.3 g of commercial-grade phosphoric acid (contained 4.5 g of $H_3PO_4$ and 0.8 g $H_2O$) in 601.1 g of deionized water.

The resultant catalyst precursor concentrate contained 0.2 wt.% Mo and had a P/Mo atom ratio of 0.26/1. This catalyst precursor concentrate of Example 3 is a catalyst precursor concentrate in accordance with the present invention.

EXAMPLE 4 (COMPARATIVE)

Preparation Of Catalyst Precursor Concentrate Comprising Phosphomolybdic Acid In Atmospheric Residuum A catalyst precursor concentrate was prepared according to the procedure given in Example 3.

The water solution that was mixed with the atmospheric residuum contained 56.3 g of phosphomolybdic acid (0.083/1 P/Mo atom ratio) in 606.4 g of deionized water.

The resultant catalyst precursor concentrate contained 0.2 wt.% Mo and had a P/Mo atom ratio of 0.083/1. This catalyst precursor concentrate of Example 4 is not a catalyst precursor in accordance with the present invention.

EXAMPLE 5

Preparation Of Dewatered Catalyst Precursor Concentrate Comprising Phosphoric Acid Modified Phosphomolybdic Acid In Atmospheric Residuum A catalyst precursor concentrate was prepared according to the procedure given in Example 3, except that the precursor concentrate was subsequently heated to 300° F. with $N_2$ flow to remove water.

The resultant, dewatered catalyst precursor concentrate contained 0.21 wt.% Mo and had a P/Mo atom ratio of 0.26/1. This catalyst precursor concentrate of Example 5 is a catalyst precursor concentrate in accordance with the present invention.

EXAMPLE 6

Hydroconversion Experiments Comparing Precursor Concentrates

The relative effectiveness of the precursor concentrates of Examples 1 through 5 was determined in laboratory hydroconversion tests which were carried out in the following manner:

A 300 ml Autoclave Engineers stirred autoclave was charged at room temperature with an amount of catalyst precursor concentrate (typically 15 g) that furnished 250 wppm Mo on the total charge of hydrocarbonaceous materials which charge comprised the precursor concentrate and a heavy Arabian vacuum residuum (typically 105 g) that contained 88.6 wt.% of material boiling above 975° F. and 21.1 wt.% of Conradson carbon components.

After charging the catalyst precursor concentrate and residuum feed, the autoclave was flushed with nitrogen, sealed, and heated with stirring from room temperature to 158° F. for a 15 minute stirred contact.

The autoclave was cooled to room temperature, flushed with hydrogen, charged with 50 psia H$_2$S and 1365 psia H$_2$, and then heated with stirring from room temperature up to 725° F. for a stirred contact period of 20 minutes.

Upon completion of the 20 minute contact, a flow of H$_2$ was started through the autoclave and the autoclave was heated to the hydroconversion reaction temperature of 830° F. where it was held with stirring for a period of 180 minutes. Autoclave pressure during this reaction period was held at 2100 psig and the gas flow (measured at the reactor outlet at room temperature and atmospheric pressure) was 0.36 liter/minute.

The autoclave was then cooled, gaseous products were removed and collected for analysis of composition by mass spectrometry. Liquid and solid products remaining in the autoclave were removed by washing with toluene and the toluene wash was then filtered to recover insoluble solids. These solids were subsequently washed free of adhering oil with additional toluene and vacuum oven dried.

The yield of coke for the hydroconversion reaction was determined by burning a weighed sample of the toluene insoluble solids to obtain the weight fraction of carbon and the yield of coke was calculated as shown in Equation (1).

As can be seen from Table II, by comparing Example 1 with Example 2 and Examples 3 and 5 with Example 4, hydroconversion experiments utilizing a catalyst prepared in accordance with the present invention (catalyst precursor concentrate of Examples 1, 3 and 5) resulted in lower coke yield.

TABLE II

| HYDROCONVERSION TEST RESULTS ON CATALYST PRECURSOR CONCENTRATES | | | | | |
|---|---|---|---|---|---|
| Experiment No. | R-1491 | R-1492 | R-1457 | R-1448 | R-1821 |
| Catalyst precursor concentrate of: | Example 1 | Example 2 | Example 3 | Example 4 | Example 5 |
| P/Mo atom ratio | 0.26 | 0.083 | 0.26 | 0.083 | 0.26 |
| Dewatered | No | No | No | No | Yes |
| Coke yield from hydroconversion, wt. % on vacuum resid | 1.78 | 5.06 | 1.68 | 2.29 | 1.65 |

Equation (1)

$$\text{Coke Yield, \%} = \frac{\text{g. toluene insoluble solids} \times \text{wt. fraction carbon}}{\text{g. vacuum residuum} \times 0.85^*} \times 100$$

*This is an empirical factor for converting grams carbon to grams coke.

What is claimed is:

1. A process for hydroconverting a heavy hydrocarbonaceous oil chargestock comprising a catalyst to produce lower boiling hydrocarbon products, which comprises reacting said chargestock with hydrogen at hydroconversion conditions, including a temperature ranging from about 800 to about 900° F., said catalyst having been prepared by the steps which comprise:
   (a) adding phosphoric acid to an aqueous solution of phosphomolybdic acid in an amount to provide in said solution an atomic ratio of phosphorus to molybdenum ranging from 0.12:1 to 0.45:1; and, subsequently
   (b) forming a mixture of a hydrocarbonaceous material having a different boiling point range from said chargestock and the aqueous solution resulting from step (a), in an amount to provide in said mixture from about 0.2 to 2 weight percent molybdenum, calculated as elemental metal, based on said hydrocarbonaceous material to produce a catalyst precursor concentrate;
   (c) introducing at least a portion of said catalyst precursor concentrate into said chargestock; and
   (d) heating the mixture resulting from step (b), or the mixture resulting from step (c) in the presence of a gas selected from the group consisting of a hydrogen-containing gas, a hydrogen sulfide-containing gas and mixtures thereof at conditions to convert said phosphomolybdic acid and said phosphoric acid to a solid molybdenum and phosphorus-containing catalyst.

2. The process of claim 1 wherein prior to step (c), water is removed from said mixture of step (b).

3. The process of claim 1 wherein said phosphoric acid is added in step (a) in an amount to provide an atomic ratio of P/Mo ranging from 0.2:1 to 0.4:1.

4. The process of claim 1 wherein said heating of step (d) is conducted at a temperature ranging from about 500° to 779° F.

5. The process of claim 1 wherein in step (b), said molybdenum is present in said mixture in an amount ranging from about 0.2 to 1 weight percent.

6. The process of claim 1 wherein said heating of step (d) is conducted at a temperature ranging from about 650° to about 779° F.

7. The process of claim 1 wherein said hydrocarbonaceous material of step (b) is an atmospheric residuum.

8. The process of claim 1 wherein said catalyst precursor concentrate of step (b) is heated in the presence of said gas at conditions, including a temperature ranging from about 500° to about 779° F., to convert said phosphomolybdic acid and phosphoric acid to produce said solid catalyst and, thereafter, at least a portion of the resulting concentrate comprising said solid catalyst is introduced into said chargestock.

9. The process of claim 1 wherein said catalyst precursor concentrate of step (b) is heated to remove the water, and, thereafter, the resulting water-free catalyst precursor concentrate is introduced into said chargestock.

10. The process of claim 1 wherein said hydroconversion conditions include a temperature ranging from about 820° to about 870° F. and a hydrogen partial pressure ranging from about 50 to about 5000 psig.

11. The process of claim 1 wherein said catalyst is present in said carbonaceous chargestock in an amount to provide from about 10 to about 2000 wppm molybdenum, calculated as elemental metal, based on said carbonaceous chargestock.

12. The process of claim 1 wherein said heavy hydrocarbonaceous oil chargestock is a vacuum residuum.

* * * * *